(12) United States Patent
Li et al.

(10) Patent No.: US 10,261,908 B2
(45) Date of Patent: Apr. 16, 2019

(54) METHOD AND APPARATUS FOR EXPANDING CACHE SIZE FOR CACHE ARRAY

(71) Applicant: EMC IP HOLDING COMPANY LLC, Hopkinton, MA (US)

(72) Inventors: Liam Xiongcheng Li, Beijing (CN); Xinlei Xu, Beijing (CN); Lifeng Yang, Beijing (CN); Huadong Li, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 35 days.

(21) Appl. No.: 15/387,790

(22) Filed: Dec. 22, 2016

(65) Prior Publication Data

US 2017/0192895 A1 Jul. 6, 2017

(30) Foreign Application Priority Data

Dec. 30, 2015 (CN) .......................... 2015 1 1021242

(51) Int. Cl.
*G06F 3/06* (2006.01)
*G06F 12/0871* (2016.01)

(52) U.S. Cl.
CPC ........ *G06F 12/0871* (2013.01); *G06F 3/0605* (2013.01); *G06F 3/0631* (2013.01); *G06F 3/0632* (2013.01); *G06F 3/0683* (2013.01); *G06F 2212/1012* (2013.01); *G06F 2212/262* (2013.01); *G06F 2212/305* (2013.01); *G06F 2212/604* (2013.01)

(58) Field of Classification Search
CPC .. G06F 12/0871; G06F 3/0605; G06F 3/0631; G06F 3/0632; G06F 3/0683; G06F 2212/1012; G06F 2212/262; G06F 2212/305; G06F 2212/604
See application file for complete search history.

(56) References Cited

U.S. PATENT DOCUMENTS

| | | | |
|---|---|---|---|
| 6,275,898 B1 * | 8/2001 | DeKoning | G06F 3/0605 711/114 |
| 9,235,474 B1 * | 1/2016 | Petri | G06F 11/1417 |
| 2007/0061531 A1 * | 3/2007 | Bartfai | G06F 11/2058 711/162 |
| 2009/0210620 A1 * | 8/2009 | Jibbe | G06F 11/108 711/114 |
| 2011/0029713 A1 * | 2/2011 | Wade | G06F 3/0608 711/6 |

(Continued)

*Primary Examiner* — Michael Krofcheck
(74) *Attorney, Agent, or Firm* — BainwoodHuang

(57) ABSTRACT

There is provided a method and apparatus of expanding capacity for a cache array. The method includes in response to detecting that a first new cache disk is to be added to a first cache array, initializing the first new cache disk without disabling other cache disks in the first cache array; allocating a storage space for a cache page metadata based on a result of the initializing; storing the cache page metadata into an initialized directory logical unit number, DIR LUN; storing a copy of the cache page metadata from a memory into the DIR LUN to facilitate the first cache disk to be in a ready state; and in response to the first new cache disk being in the ready state, configuring the first new cache disk as being in an initialized state to expand the capacity of the first cache array.

16 Claims, 5 Drawing Sheets

(56) References Cited

U.S. PATENT DOCUMENTS

2013/0124776 A1* 5/2013 Hallak ............... G06F 11/1092
    711/102
2014/0325121 A1* 10/2014 Akutsu ............... G06F 3/0604
    711/103

* cited by examiner

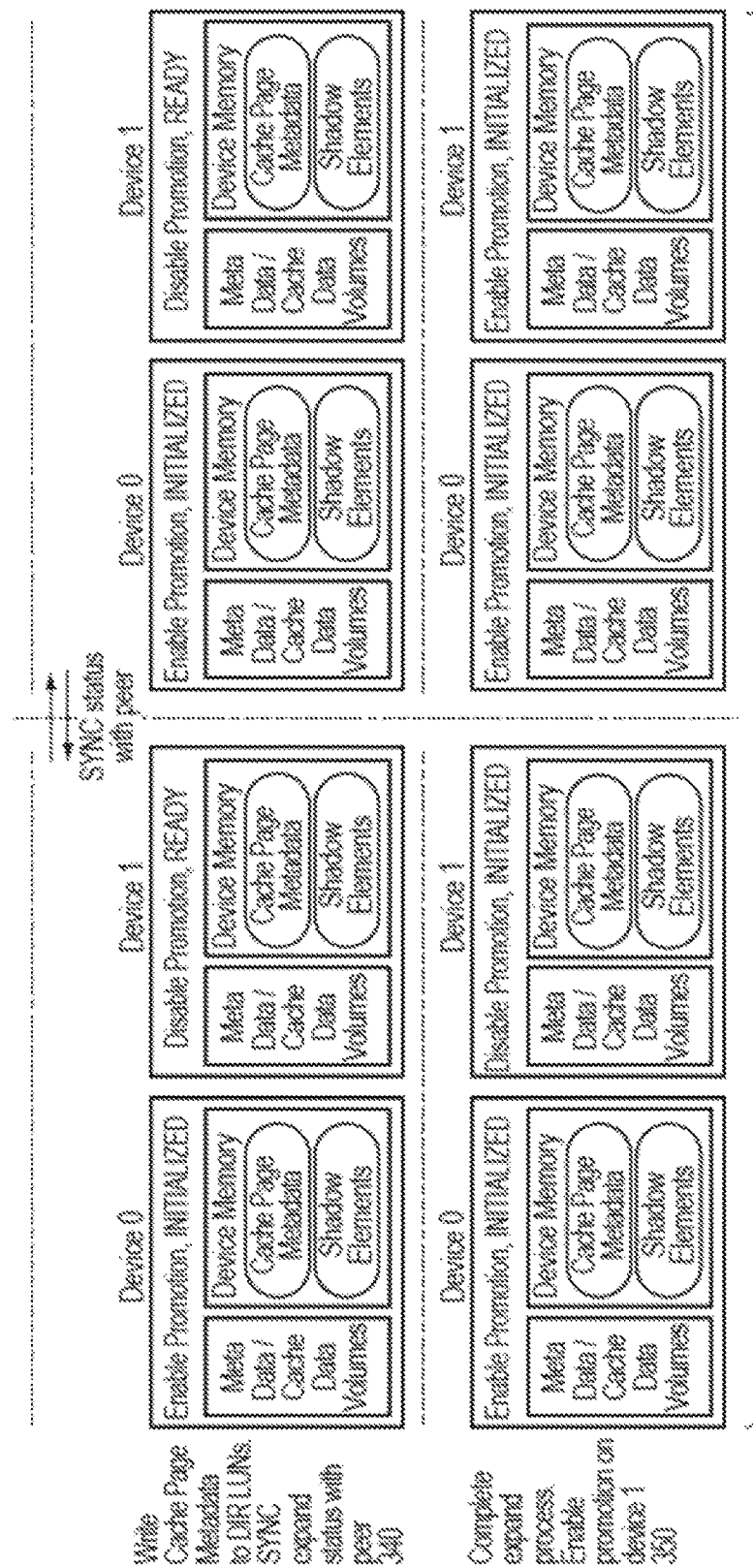

METHOD AND APPARATUS FOR EXPANDING CACHE SIZE FOR CACHE ARRAY

RELATED APPLICATIONS

This application claim priority from Chinese Patent Application Number CN201511021242.X, filed on Dec. 30, 2015 at the State Intellectual Property Office, China, titled "METHOD AND DEVICE FOR CACHE ARRAY EXPANSION" the contents of which is herein incorporated by reference in its entirety.

FIELD

Embodiments of the present disclosure relate to the storage field in general, and more particularly to the method and apparatus for expanding cache size for cache array.

BACKGROUND

Fast cache is second tier cache in some storage products. It transparently caches data from hard disk drive (HDD) to solid storage disks (SSD). It is known that SSD has much more powerful performance than HDD.

In the previous implementations of fast cache, if users want to expand fast cache with more SSDs, they have to disable the current fast cache to promote all the data therein to the hard disk, destroy the fast cache, and then rebuild the fast cache with more SSDs. This means hot data which have been promoted previously into the fast cache will be lost and it takes a long time for the hot data to be promoted again in the fast cache. During destruction/creation, the user cannot get any benefit from fast cache. Even worse impact might be incurred to the overall performance of the cache array because more internal inputs/outputs (IOs) are generated during this process.

SUMMARY OF THE INVENTION

In order to solve the above problem, embodiments of the present disclosure provide method and apparatus for expanding cache size for cache array. The method enables to add new cache disks to the existing cache array to expand capacity of the existing cache array without disabling the current/existing cache disks. For the previous FAST Cache implementations with no option of capacity expansion, if users find that current SSDs are not enough to cache hot data, they will first need to disable/destroy FAST Cache and then rebuild the FAST Cache with more SSDs, which may involve destruction. In comparison, the feature of online FAST Cache capacity expanding shown in the embodiments of the present disclosure does not cause destruction. Furthermore, as more SSDs are introduced in FAST Cache, which enables to cache more hot data, hence better performance can be achieved than the previous FAST Cache does.

The first aspect of the present disclosure provides a method of expanding a capacity of a cache array, comprising: in response to detecting that a first new cache disk is to be added to a first cache array, initializing the first new cache disk without disabling other cache disks in the first cache array; allocating a storage space for a cache page metadata based on a result of the initializing; storing the cache page metadata into an initialized directory logical unit number, DIR LUN; storing a copy of the cache page metadata from a memory into the DIR LUN to facilitate the first cache disk to be in a ready state; and in response to the first new cache disk being in the ready state, configuring the first new cache disk as being in an initialized state to expand the capacity of the first cache array.

As the above cache disk capacity expanding operation can be implemented without disabling the current cache disk, hot data that have been promoted to FAST Cache previously will not be lost and the performance of FAST Cache will not be affected.

According to the embodiments of the present disclosure, initializing the first new cache disk comprises: creating a DIR LUN and a data logical unit number, DATA LUN.

According to the embodiments of the present disclosure, the method further comprises: detecting whether the first new cache disk is inserted into the first cache array; and in response to detecting that the first new cache disk is inserted into the first cache array, determining whether the first new cache disk is to be added to the first cache array. This process will be beneficial for providing a more friendly interface for the user so that the user can determine if it is necessary to expand the capacity or if the capacity expanding operation can bring forth performance improvement before deciding to expand the capacity of the current cache array.

According to the embodiments of the present disclosure, determining whether to add the first new cache disk to the first cache array comprises: configuring a first count value and a second count value, wherein the first count value indicates a count value of pages that have been accessed and cached in the first cache array, and the second count value indicates a count value of pages that have been accessed but not promoted to the first cache array; and if the first count value is less than the second count value, determining that the first new cache disk is to be added into the first cache array. The configuration of the above count values is beneficial for determining quantitatively whether to implement the capacity expanding operation.

According to the embodiments of the present disclosure, in response to the first new cache disk being in the ready state, determining the first new cache disk as being in an initialized state to expand the capacity of the first cache array comprises: in response to the first new cache disk being in the ready state and a second new cache disk in a second cache array also being in the ready state, expanding the capacity of the first cache array, wherein the second cache array is configured as an peer cache array of the first cache array.

According to the embodiments of the present disclosure, in response to the first new cache disk being in the ready state and the second new cache disk in the second cache array also being in the ready state, expanding the capacity of the first cache array comprises: in response to the first new cache disk being in the ready state, sending, from the first cache array to the second cache array, an indication indicating that the first new cache disk is in the ready state; and in response to the first cache array receiving from the second cache array an indication indicating that the second new cache disk is also in the ready state, configuring the first new cache disk as being in the initialized state to expand the capacity of the first cache array. This additional confirmation step of the peer cache array from, for example, the second cache array, is particularly beneficial for ensuring data security.

According to the embodiments of the present disclosure, the method further comprises: if a failure occurs in adding the first new cache disk: in response to a failure confirmation message being received by the first cache array, configuring the first cache array as being in a failure state, so that the first new cache disk can be removed from the first cache array.

According to the embodiments of the present disclosure, in response to a failure confirmation message being received by the first cache array, the first cache array is configured as being in a failure state, so that the first new cache disk can be removed from the first cache array comprises: sending a failure message from the first cache array to the second cache array to indicate a failure occurring at any step of the capacity expansion of the first cache array; in response to the failure message being accepted by the second cache array, configuring the first cache array as being in the failure state to enable the first new cache disk to be removed from the first cache array; and in response to the failure message being rejected by the second cache array, configuring the first cache array as being in a waiting state to wait for the second cache array to receive the failure message, wherein if the capacity of the second cache array is unexpanded, the second cache array rejects the failure message from the first cache array, and wherein if the capacity of the second cache array is expanded, the second cache array receives the failure message from the first cache array. Under failure, the additional confirmation step of the peer cache array from, for example, the second cache array, is likewise beneficial for ensuring data security.

The second aspect of the present disclosure provides an apparatus for expanding a capacity of cache array, comprising: an initialization unit configured for initializing a first new cache disk in response to detecting the first new cache disk that is to be added to the first cache array, without disabling other cache disks in the first cache array; a storage space allocating unit configured for allocating a storage space for a cache page metadata based on a result of the initializing; a first writing unit configured for storing the cache page metadata into an initialized directory logical unit number, DIR LUN; a second writing unit configured for storing a copy of the cache page metadata from a memory into the DIR LUN to facilitate the first cache disk to be in a ready state; and a capacity expansion determining unit configured for configuring the first new cache disk as being in an initialized state in response to the first new cache disk being in the ready state, to expand the capacity of the first cache array.

According to the embodiments of the present disclosure, the initialization unit is configured for creating a DIR LUN and a data logical unit number, DATA LUN.

According to the embodiments of the present disclosure, the apparatus further comprises: a detecting unit configured for detecting whether the first new cache disk is inserted into the first cache array; and a first judging unit configured for determining whether the first new cache disk is to be added to the first cache array, in response to detecting that the first new cache disk is inserted into the first cache array.

According to the embodiments of the present disclosure, the first judging unit comprises: a count value configuration unit configured for configuring the first count value and the second count value, wherein the first count value indicates a count value of pages that have been accessed and cached in the first cache array, and the second count value indicates a count value of the pages that have been accessed but not promoted to the first cache array; and a second judging unit configured for determining that the first new cache disk is to be added into the first cache array, if the first count value is less than the second count value.

According to the embodiments of the present disclosure, the capacity expansion determining unit comprises: a first determining unit configured for expanding the capacity of the first new cache array in response to the first new cache disk being in the ready state and a second new cache disk in a second cache array also being in the ready state, wherein the second cache array is configured as an peer cache array of the first cache array.

According to the embodiments of the present disclosure, the determining unit comprises: a sending unit configured for sending, from the first cache array to the second cache array, an indication indicating that the first new cache disk is in the ready state, in response to the first new cache disk being in the ready state; and a receiving unit configured for configuring the first new cache disk as being in the initialized state in response to the first cache array receiving from the second cache array an indication indicating that the second new cache disk is also in the ready state, to expand the capacity of the first cache array.

According to the embodiments of the present disclosure, the apparatus further comprises a failure detection unit configured for: if a failure occurs in adding the first new cache disk: in response to a failure confirmation message being received by the first cache array, configuring the first cache array to be a the failure state, so that the first new cache disk can be removed from the first cache array.

According to the embodiments of the present disclosure, the failure detection unit comprises: a failure message sending unit configured for sending the failure message from the first cache array to the second cache array to indicate a failure occurs at any of the capacity expansion steps for the first cache array; and an identifying unit configured for in response to the failure message, being received by the second cache array, configuring the first cache array as being in the failure state to enable the first new cache disk to be removed from the first cache array; and in response to the failure message being rejected by the second cache array, continuing the first cache array as being in a waiting state to wait for the second cache array to receive the failure message, wherein if the capacity expansion of the second cache array is unexpanded, the second cache array rejects the failure message from the first cache array, and wherein, if the capacity, expansion of the second cache array is expanded, the second cache array receives the failure message from the first cache array.

The third aspect of the present disclosure provides a computer program product for expanding a capacity of a cache array, the compute program product being tangibly stored in the non-transitory computer readable medium and comprising machine-implementable instructions which enable a machine to implement the steps of the method according to the first aspect of the present disclosure.

BRIEF DESCRIPTION OF THE DRAWINGS

FIG. 3, referencing FIGS. 3A and 3B, illustrates a block diagram of the method for expanding capacity for a cache array according to embodiments of the present disclosure.

DETAILED DESCRIPTION OF EMBODIMENTS

Figure 1:
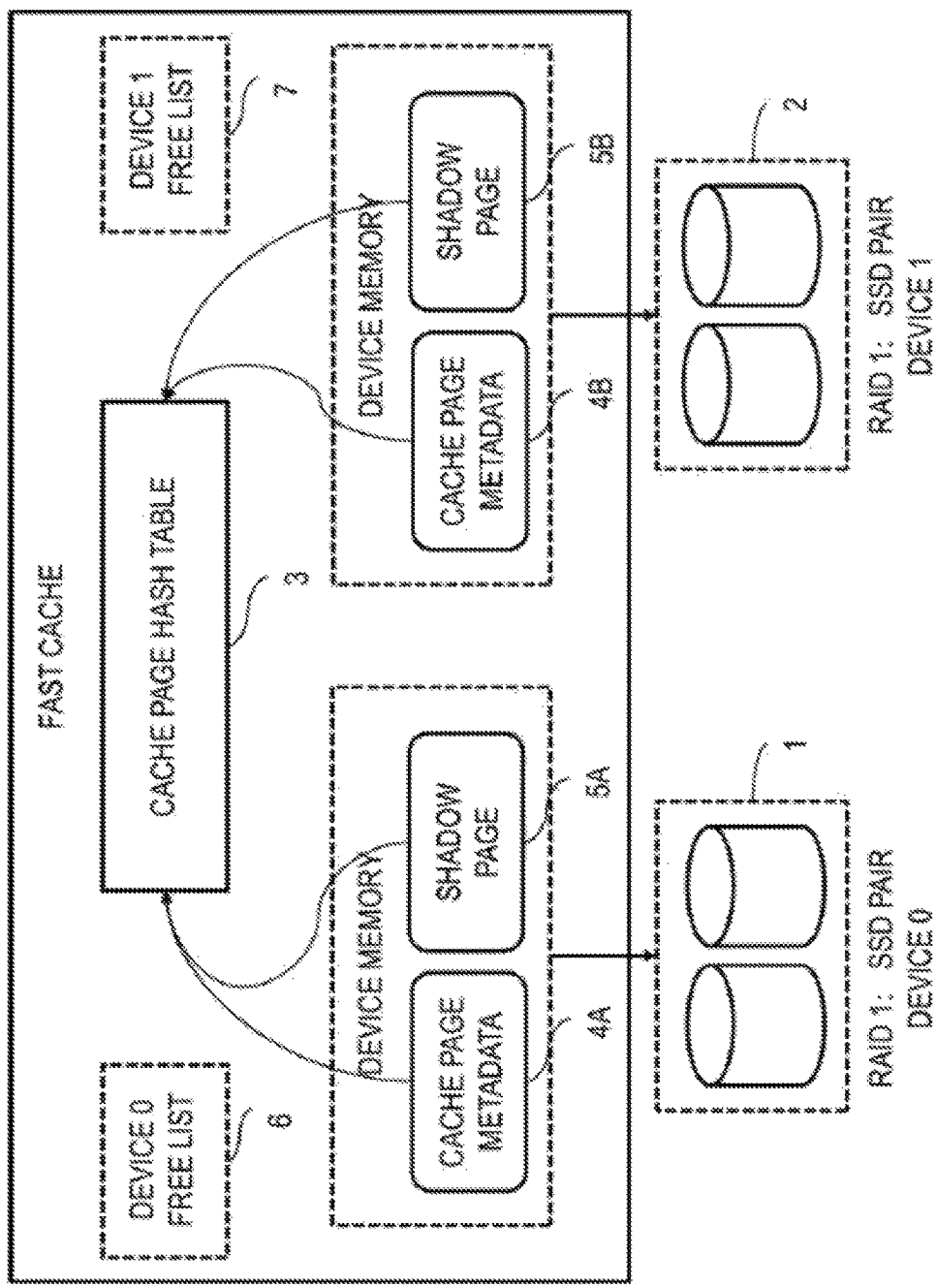
FIG. 1 illustrates a relationship diagram of FAST Cache devices accordion to embodiments of the present disclosure.

Reference is made to several exemplary embodiments shown in the drawings to describe principles of the present disclosure. Though preferred embodiments of the present disclosure are illustrated in the drawings, it should be appreciated that the embodiments are described only to facilitate those skilled in the art in better understanding and thereby achieving the present disclosure, rather than to limit the scope of the disclosure in any manner.

FIG. 1 illustrates the relationship diagram of FAST Cache devices according to an embodiment of the present disclosure. According to the embodiment as shown in FIG. 1, two SSD disks (also called SSD pair) are provided to fast cache as a Raid group (i.e. Raid 1) and the pair of SSD disks are considered as FAST Cache devices (1, 2) for storing hot data for the user.

According to an embodiment of the present disclosure, each cache page comprises metadata storing mapping information of the pages in SSD and HDD and message indicating if the page is dirty. The mapping information is stored in the cache page Hash table (3) as shown in FIG. 1.

According to an embodiment of the present disclosure, each device (device 0 or device 1 as shown in FIG. 1) can cache a certain number of cache pages, for instance, N cache pages (4A, 4B). Moreover, the FAST Cache is allocated with N shadow pages (5A, 5B) correspondingly to follow history information of input/output (I/O) that has been accessed but not cached in SSD.

It is to be noted that the embodiment as illustrated in FIG. 1 do not intend to limit the specific number of the device. More devices (e.g. device 2, device 3 . . . device n) can be included in the FAST Cache.

According to the embodiments of the present disclosure, the FAST Cache further comprises free lists. For example, free list of device 0 (6) and free list of device 1 (7) shown in FIG. 1 can be used to indicate the number of pages for promoting data.

Figure 2:
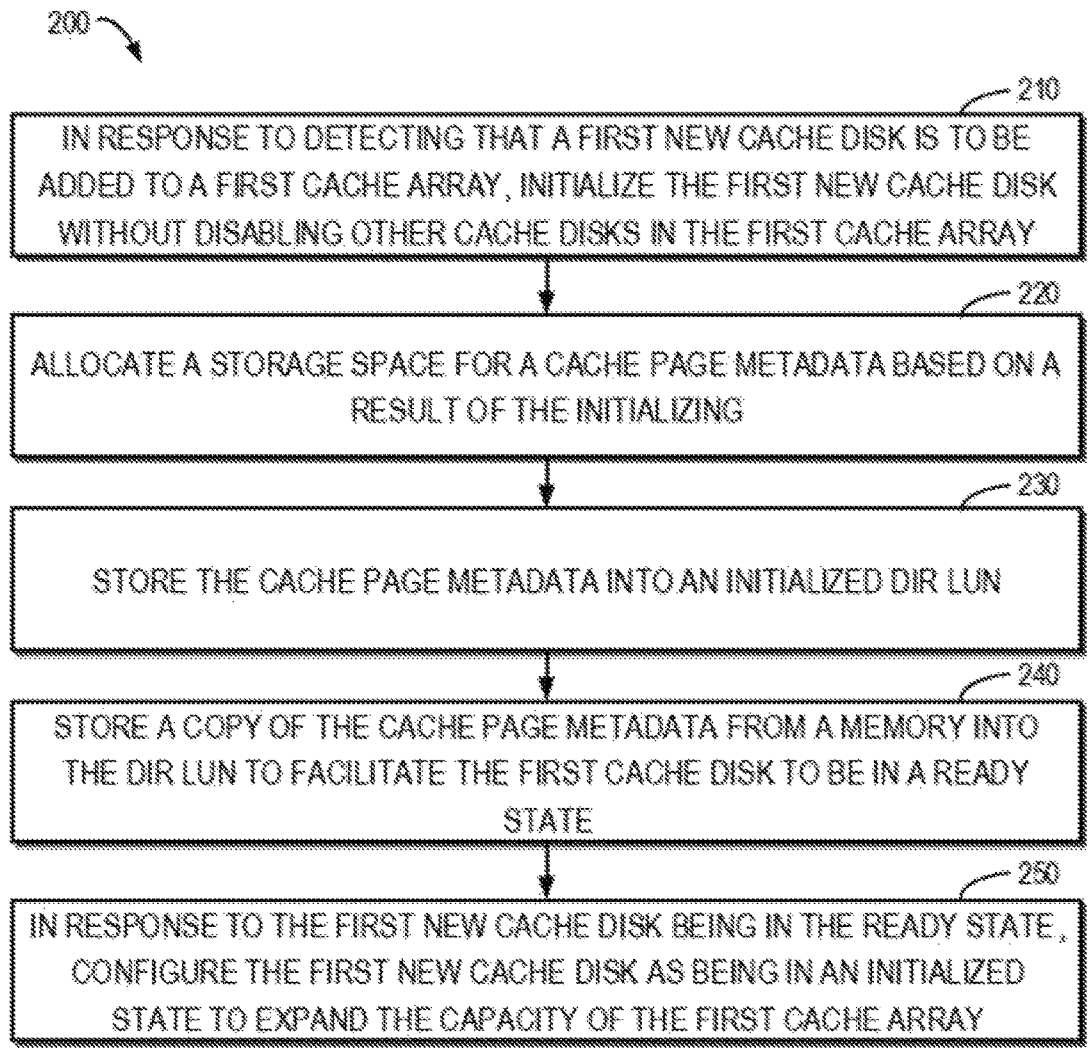
FIG. 2 illustrates a flow chart of the method for expanding capacity for a cache array according to embodiments of the present disclosure.

FIG. 2 illustrates a flow chart of method 200 for expanding capacity of the cache array according to the embodiments of the present disclosure. Method 200 comprises steps 210 to 250:

At 210, in response to detecting that the first new cache disk that is added to the first cache array, initializing the first new cache disk without disabling other cache disks in the first cache array. At 220, allocating storage space for the cache page metadata based on the result of initialization. At 230 storing the cache page metadata into the initialized DIR LUN. At step 240, storing a copy of the cache page metadata (or the same cache page metadata) from the memory into the DIR LUN to facilitate the first cache disk is in the ready state. At step 250, in response to the first new cache disk being in the ready state, configuring the first new cache disk as being in an initiated state to expand the capacity of the first cache array.

According to the embodiments of the present disclosure, initializing the first new cache disk includes creating a DIR LUN and a DATA LUN.

According to the embodiments of the present disclosure, when FAST Cache is nearly full with hot data, more SSDs should be added to the cache array to expand capacity of the cache array. Therefore, in order to provide a more friendly user interface so that the user knows whether there is a need to expand capacity of the cache array, method 200 for expanding capacity of the cache array can additionally include determining whether to add the first new cache disk into the first cache array upon detecting the first new cache disk is inserted to the first cache array.

According to the embodiments of the present disclosure, determining whether to add the first new cache disk into the first cache array includes configuring a first count value and a second count value. The first count value indicates the count value of the pages that have been accessed and cached in the first cache array. For example, the first count value can be cache hit count and the second count value can be a count value of the pages that have been accessed but not promoted to the first cache array, that is, shadow pages. For example, the second count value can be shadow hit count, and the shadow hit is considered as the "virtual" cache hit. If the first count value is less than the second count value, for instance, if cache hit count<shadow hit count, it can be determined that the first new cache disk is to be added into the first cache array.

In practice, according to an embodiment, the cache size X (i.e. the maximum number of cache pages that the cache can stored) can be used for normalizing the cache hit count (as the first count value) to obtain the first cache page hit rate according to the following equation (1):

$$Y = \frac{\text{cache hit count}}{X}, \quad (1)$$

where represents the first cache page hit rate.

According to this specific embodiment, the shadow cache size can be set as equal to that of the cache, namely, the size of both can be set to be X, so that the influence of the shadow hit count value may be taken into consideration in the calculation of the overall cache hit rate. For instance, the cache hit count value (as the first count value) and the shadow hit count value (as the second count value) may together be normalized to obtain a second cache hit rate according to the following equation (2):

$$Z = \frac{\text{cache hit count} + \text{shadow hit count}}{2X} \quad (2)$$

where Z represents the second cache hit rate.

It can be mathematically proven that if Z is larger than Y, then it indicates that there are many paces that have been accessed for several times but not been promoted to the FAST Cache. Therefore, it is necessary for the user to expand the capacity of FAST Cache to gain more benefits.

Figure 3A:
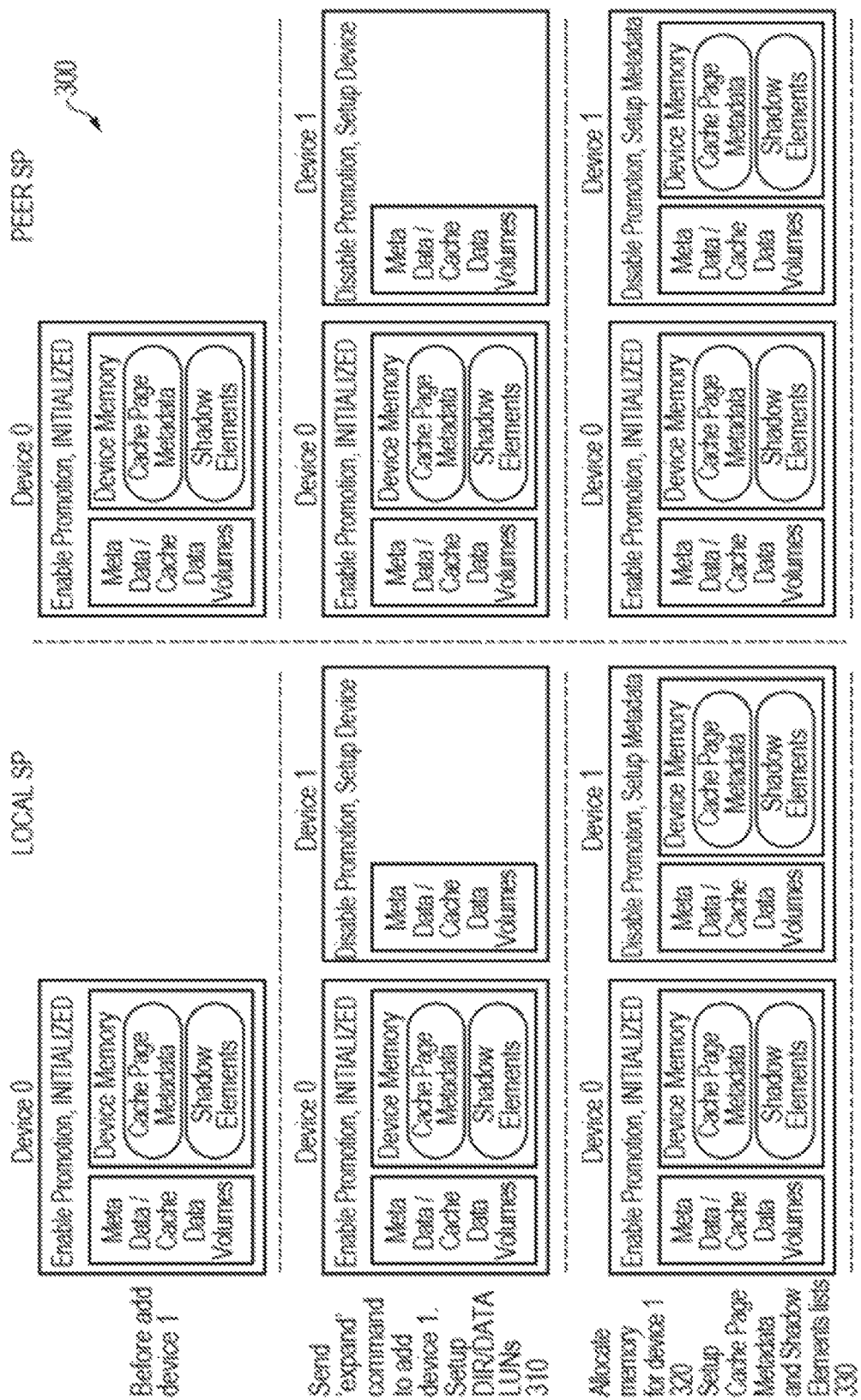
Figure 4:
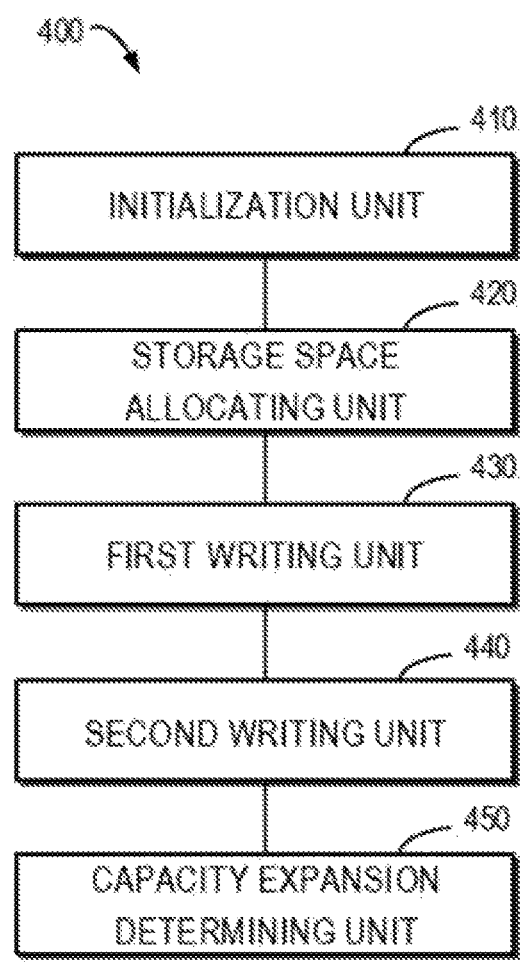
FIG. 4 illustrates a block diagram of the apparatus for expanding capacity for a cache array according to embodiments of the present disclosure.

FIG. 3, referencing FIGS. 3A and 3B illustrates a block diagram of method 300 for expanding capacity for the cache array according to another embodiment of the present disclosure. Method 300 includes steps 310 to 350. Device 0 is the current cache disk while device 1 is the new cache disk to be added to the cache array. Detailed description will be given below in FIG. 3 in conjunction with FIGS. 1 and 2.

A dual storage processor (SP) system is used in the detailed embodiment as shown in FIG. 3, namely, the local SP and the peer SP. The system enables communication between the two SPs by means of massage passing service, MPS. The synchronization, SYNC, transaction is a mechanism for updating/preserving data between two SPs.

In the embodiment as illustrated in FIG. 3, steps 310 to 350 of method 300 correspond substantially to steps 210 to 250 of method 200 as shown in FIG. 2.

In particular, at 310, the command "EXPAND" is firstly sent to start adding device 1 and then DIR LUN and DATA LUN for device 1 is configured. At 320, storage space for device 1 is allocated, and at 330, cache page metadata and shadow data lists are setup. At 340, cache page metadata is written into DIR LUN and a synchronization with the peer SP is performed. At 350, the capacity expansion is completed to enable promoting data to device 1.

The method 300 as illustrated in FIG. 3 differs from method 200 in that the method 300 comprises the following additional processing at 340, namely, in response to the first new cache disk (e.g. device 1 in local SP) being in the ready state and the second new cache disk in the second cache array (e.g. device 1 in the peer SP) also being in the ready state, completing capacity expansion of the first new cache array. In this example, the second cache array (e.g. peer SP) is configured as the peer cache array of the first cache array (e.g. local SP).

According to the embodiments of the present disclosure, in response to the first new cache disk being in the ready state and the second new cache disk in the second cache array also being in the ready state, expanding the capacity of the first new cache array includes: in response to the first new cache disk (such as device 1 in the local SP) being in the ready state, sending an indication indicating that the first new cache disk is in the ready state, such as the SYNC state as shown in FIG. 3, from the first cache array to the second cache array. Upon the first cache array (e.g. local SP) receiving from the second cache array (e.g. the peer SP) an indication indicating that the second new cache disk is also in the ready state, configuring the first new cache disk as being in the initialized state to complete capacity expansion of the first cache array.

According to the embodiments of the present disclosure, the method 200 and method 300 may further include: if a failure occurs in adding the first new cache disk, upon the failure confirmation message being received by the first cache array, configuring the first cache array as being in a failure state, so that the first new cache disk can be removed from the first cache array.

According to the embodiments of the present disclosure, if a failure occurs in adding the first new cache disk, local SP and the peer SP are synchronized so that the first new cache disk, such as device 1, can be removed from the first cache array, such as the local SP.

According to an embodiment of the disclosure, in response to a failure confirmation message received by the first cache array, configuring the first cache array as being in a failure state, so that the first new cache disk can be removed from the first cache array includes: sending a failure message from the first cache array (e.g. local SP) to the second cache array (e.g. peer SP) to indicate a failure occurring at any step of the capacity expansion of the first cache array. If the failure message is accepted by the second cache array, configuring the first cache array as being the failure state to enable the first new cache disk to be removed from the first cache array; otherwise, if the failure message is rejected by the second cache array, configuring the first cache array as being in a waiting state to wait for the second cache array to receive the failure message. If the capacity of the second cache array is unexpanded, the second cache array rejects the failure message from the first cache array, and if the capacity of the second cache array is expanded, the second cache array receives the failure message from the first cache array.

According to a more detailed embodiment of the present disclosure, if a failure occurs at any step of method 200 or method 300:

On the side of local SP: launching SYNC transaction of peer SP; if peer SP accepts the SYNC transaction, the to be added device (i.e. device 1 in the local SP) is identified as a failure state, and waiting for the user command to remove this cache device; if peer SP rejects the SYNC transaction, the local SP should wait for the completion of capacity expansion in the peer SP and then restart a SYNC transaction;

On the side of peer SP: if the peer SP receives SYNC transaction, the peer SP checks its own state firstly; if the peer SP does not complete the step of capacity expansion, it rejects the SYNC transaction coming from the local SP and does not restart SYNC transaction until it completes the its own capacity expansion; if the peer SP has completed the step of capacity expansion, it accepts SYNC transaction from the local SP and identifies it as in a failure state. After the states of the capacity expansion on both sides have been synchronized, the user may publish a command to remove the failed cache device.

The second aspect of the present disclosure provides an apparatus 400 for expanding a capacity of cache array. The apparatus 400 includes an initialization unit 410 configured for initializing a first new cache disk in response to detecting the first new cache disk that is to be added to the first cache array, without disabling other cache disks in the first cache array; a storage space allocating unit 420 configured for allocating a storage space for a cache page metadata based on a result of the initializing; a first writing unit 430 configured for storing the cache page metadata into an initialized directory logical unit number, DIR LUN; a second writing unit 440 configured for storing a copy of the cache page metadata from a memory into the DIR LUN to facilitate the first cache disk to be in a ready state; and a capacity expansion determining unit 450 configured for configuring the first new cache disk as being in an initialized state in response to the first new cache disk being in the ready state, to expand the capacity of the first cache array.

According to the embodiments of the present disclosure, the initialization unit 410 is configured for creating a DIR LUN and a data logical unit number, DATA LUN.

According to the embodiments of the present disclosure, the apparatus 400 further includes a detecting unit configured for detecting whether the first new cache disk is inserted into the first cache array; and a first judging unit configured for determining whether the first new cache disk is to be added to the first cache array, in response to detecting that the first new cache disk is inserted into the first cache array.

According to the embodiments of the present disclosure, the first judging unit includes: a count value configuration unit configured for configuring the first count value and the second count value, wherein the first count value indicates a count value of pages that have been accessed and cached in the first cache array, and the second count value indicates a count value of the pages that have been accessed but not promoted to the first cache array; and a second judging unit configured for determining that the first new cache disk is to be added into the first cache array, if the first count value is less than the second count value.

According to the embodiments of the present disclosure, the capacity expansion determining unit 450 comprises: a first determining unit configured for expanding the capacity of the first new cache array in response to the first new cache disk being in the ready state and a second new cache disk in a second cache array also being in the ready state, wherein the second cache array is configured as au peer cache array of the first cache array.

According to the embodiments of the present disclosure, the determining unit comprises: a sending unit configured for sending, from the first cache array to the second cache array, an indication indicating that the first new cache disk is in the ready state, in response to the first new cache disk being in the ready state; and a receiving unit configured for configuring the first new cache disk as being in the initialized state in response to the first cache array receiving from the second cache array an indication indicating that the second new cache disk is also in the ready state, to expand the capacity of the first cache array.

According to the embodiments of the present disclosure, the apparatus further comprises a failure detection unit configured for: if a failure occurs in adding the first new cache disk: in response to a failure confirmation message being received by the first cache array, configuring the first cache array to be a the failure state, so that the first new cache disk can be removed from the first cache array.

According to the embodiments of the present disclosure, the failure detection unit comprises: a failure message sending unit configured for sending the failure message from the first cache array to the second cache array to indicate a failure occurs at any of the capacity expansion steps for the first cache array; and an identifying unit configured for in response to the failure message being received by the second cache array, configuring the first cache array as being in the failure state to enable the first new cache disk to be removed from the first cache array; and in response to the failure message being rejected by the second cache array, configuring the first cache array as being in a waiting state to wait for the second cache array to receive the failure message, wherein if the capacity expansion of the second cache array is unexpanded, the second cache array rejects the failure message from the first cache array, and wherein, if the capacity expansion of the second cache array is expanded, the second cache array receives the failure message from the first cache array.

The third aspect of the present disclosure provides a computer program product for expanding a capacity of a cache array, the compute program product being tangibly stored in the non-transitory computer readable medium and comprising machine-implementable instructions which enable a machine to implement the steps of the method according to the first aspect of the present disclosure.

To sum up, various embodiments of the present disclosure provide a method of expanding a capacity of a cache array, comprising: in response to detecting that a first new cache disk is to be added to a first cache array, initializing the first new cache disk without disabling other cache disks in the first cache array; allocating a storage space for a cache page metadata based on a result of the initializing; storing the cache page metadata into an initialized directory logical unit number, DIR LUN; storing a copy of the cache page metadata from a memory into the DIR LUN to facilitate the first cache disk to be in a ready state; and in response to the first new cache disk being in the ready state, configuring the first new cache disk as being in an initialized state to expand the capacity of the first cache array. The method enables adding new cache disks to the cache array to expand capacity of the cache array without disabling the current cache.

The above are only optional embodiments of the present disclosure which are not for the limiting purpose. For those skilled in the art, the present disclosure allows various modifications and changes. Any modifications, equivalent alternatives and improvement, etc. within the spirit and principle of the present disclosure shall be included in the scope of protection of the present disclosure.

What is claimed is:

1. A method of expanding a capacity of a cache array, comprising:
   in response to detecting that a first new cache disk is to be added to a first cache array, initializing the first new cache disk without disabling other cache disks in the first cache array;
   allocating a storage space for a cache page metadata based on a result of the initializing;
   storing the cache page metadata into an initialized directory logical unit number, DIR LUN;
   storing a copy of the cache page metadata from a memory into the DIR LUN to facilitate the first cache disk to be in a ready state; and
   in response to the first new cache disk being in the ready state, configuring the first new cache disk as being in an initialized state to expand the capacity of the first cache array;
   if a failure occurs in adding the first new cache disk:
     in response to a failure confirmation message being received by the first cache array, configuring the first cache array as being in a failure state, so that the first new cache disk can be removed from the first cache array;
   wherein in response to a failure confirmation message being received by the first cache array, the first cache array is configured as being in a failure state, so that the first new cache disk can be removed from the first cache array comprises:
     sending a failure message from the first cache array to the second cache array to indicate a failure occurring at any step of the capacity expansion of the first cache array;
     in response to the failure message being accepted by the second cache array, configuring the first cache array as being in the failure state to enable the first new cache disk to be removed from the first cache array; and
     in response to the failure message being rejected by the second cache array, configuring the first cache array as being in a waiting state to wait for the second cache array to receive the failure message,
     wherein, if the capacity of the second cache array is unexpanded, the second cache array rejects the failure message from the first cache array, and
     wherein, if the capacity of the second cache array is expanded, the second cache array receives the failure message from the first cache array.

2. The method according to claim 1, wherein initializing the first new cache disk comprises:
   creating a DIR LUN and a data logical unit number, DATA LUN.

3. The method according to claim 1, further comprising:
   detecting whether the first new cache disk is inserted into the first cache array; and
   in response to detecting that the first new cache disk is inserted into the first cache array, determining whether the first new cache disk is to be added to the first cache array.

4. The method according to claim 3, wherein the determining whether the first new cache disk is to be added to the first cache array comprises:
   configuring a first count value and a second count value, wherein the first count value indicates a count value of pages that have been accessed and cached in the first cache array, and the second count value indicates a count value of pages that have been accessed but not promoted to the first cache array; and if the first count value is less than the second count value, determining that the first new cache disk is to be added into the first cache array.

5. The method according to claim 1, wherein in response to the first new cache disk being in the ready state, determining the first new cache disk as being in an initialized state to expand the capacity of the first cache array comprises:

in response to the first new cache disk being in the ready state and a second new cache disk in a second cache array also being in the ready state, expanding the capacity of the first cache array, wherein the second cache array is configured as an peer cache array of the first cache array.

6. The method according to claim 5, wherein in response to the first new cache disk being in the ready state and the second new cache disk in the second cache array also being in the ready state, expanding the capacity of the first cache array comprises:

in response to the first new cache disk being in the ready state, sending, from the first cache array to the second cache array, an indication indicating that the first new cache disk is in the ready state; and in response to the first cache array receiving from the second cache array an indication indicating that the second new cache disk is also in the ready state, configuring the first new cache disk as being in the initialized state to expand the capacity of the first cache array.

7. An apparatus for expanding a capacity of cache array, comprising:

an initialization unit configured for initializing a first new cache disk in response to detecting the first new cache disk that is to be added to the first cache array, without disabling other cache disks in the first cache array;

a storage space allocating unit configured for allocating a storage space for a cache page metadata based on a result of the initializing;

a first writing unit configured for storing the cache page metadata into an initialized directory logical unit number, DIR LUN;

a second writing unit configured for storing a copy of the cache page metadata from a memory into the DIR LUN to facilitate the first cache disk to be in a ready state; and a capacity expansion determining unit configured for configuring the first new cache disk as being in an initialized state in response to the first new cache disk being in the ready state, to expand the capacity of the first cache array;

a failure detection unit configured for:

if a failure occurs in adding the first new cache disk:

in response to a failure confirmation message being received by the first cache array, configuring the first cache array to be a the failure state, so that the first new cache disk can be removed from the first cache array;

wherein the failure detection unit comprises:

a failure message sending unit configured for sending the failure message from the first cache array to the second cache array to indicate a failure occurs at any of the capacity expansion steps for the first cache array; and an identifying unit configured for in response to the failure message being received by the second cache array, configuring the first cache array as being in the failure state to enable the first new cache disk to be removed from the first cache array; and, in response to the failure message being rejected by the second cache array, configuring the first cache array as being in a waiting state to wait for the second cache array to receive the failure message, wherein if the capacity expansion of the second cache array is unexpanded, the second cache array rejects the failure message from the first cache array, and wherein, if the capacity expansion of the second cache array is expanded, the second cache array receives the failure message from the first cache array.

8. The apparatus according to claim 7, wherein the initialization unit is configured for creating a DIR LUN and a data logical unit number, DATA LUN.

9. The apparatus according to claim 7, further comprising:

a detecting unit configured for detecting whether the first new cache disk is inserted into the first cache array; and a first judging unit configured for determining whether the first new cache disk is to be added to the first cache array, in response to detecting that the first new cache disk is inserted into the first cache array.

10. The apparatus according to claim 9, the first judging unit comprises:

a count value configuration unit configured for configuring the first count value and the second count value, wherein the first count value indicates a count value of pages that have been accessed and cached in the first cache array, and the second count value indicates a count value of the pages that have been accessed but not promoted to the first cache array; and a second judging unit configured for determining that the first new cache disk is to be added into the first cache array, if the first count value is less than the second count value.

11. The apparatus according to claim 7, wherein the capacity expansion determining unit comprises:

a first determining unit configured for expanding the capacity of the first new cache array in response to the first new cache disk being in the ready state and a second new cache disk in a second cache array also being in the ready state, wherein the second cache array is configured as an peer cache array of the first cache array.

12. The apparatus according to claim 11, wherein the determining unit comprises:

a sending unit configured for sending, from the first cache array to the second cache array, an indication indicating that the first new cache disk is in the ready state, in response to the first new cache disk being in the ready state; and a receiving unit configured for configuring the first new cache disk as being in the initialized state in response to the first cache array receiving from the second cache array an indication indicating that the second new cache disk is also in the ready state, to expand the capacity of the first cache array.

13. A computer program product for expanding a capacity of a cache array, the computer program product comprising:

a non-transitory computer readable medium encoded with computer-executable code, the code configured to enable the execution of:

in response to detecting that a first new cache disk is to be added to a first cache array, initializing the first new cache disk without disabling other cache disks in the first cache array;

allocating a storage space for a cache page metadata based on a result of the initializing;

storing the cache page metadata into an initialized directory logical unit number, DIR LUN;

storing a copy of the cache page metadata from a memory into the DIR LUN to facilitate the first cache disk to be in a ready state; and in response to the first new cache disk being in the ready state, configuring the first new cache disk as being in an initialized state to expand the capacity of the first cache array;

if a failure occurs in adding the first new cache disk:

in response to a failure confirmation message being received by the first cache array, configuring the first cache array as being in a failure state, so that the first new cache disk can be removed from the first cache array;

wherein in response to a failure confirmation message being received by the first cache array, the first cache array is configured as being in a failure state, so that the first new cache disk can be removed from the first cache array comprises:

sending a failure message from the first cache array to the second cache array to indicate a failure occurring at any step of the capacity expansion of the first cache array;

in response to the failure message being accepted by the second cache array, configuring the first cache array as being in the failure state to enable the first new cache disk to be removed from the first cache array; and in response to the failure message being rejected by the second cache array, configuring the first cache array as being in a waiting state to wait for the second cache array to receive the failure message, wherein, if the capacity of the second cache array is unexpanded, the second cache array rejects the failure message from the first cache array, and wherein, if the capacity of the second cache array is expanded, the second cache array receives the failure message from the first cache array.

14. The computer program product according to claim 13, wherein initializing the first new cache disk comprises:

creating a DIR LUN and a data logical unit number, DATA LUN.

15. The computer program product according to claim 13, wherein the code is further configured to enable the execution of:

detecting whether the first new cache disk is inserted into the first cache array; and in response to detecting that the first new cache disk is inserted into the first cache array, determining whether the first new cache disk is to be added to the first cache array.

16. The computer program product according to claim 15, wherein the determining whether the first new cache disk is to be added to the first cache array comprises:

configuring a first count value and a second count value, wherein the first count value indicates a count value of pages that have been accessed and cached in the first cache array, and the second count value indicates a count value of pages that have been accessed but not promoted to the first cache array; and if the first count value is less than the second count value, determining that the first new cache disk is to be added into the first cache array.

* * * * *